June 4, 1963

H. T. CLARK 3,092,133

FLUID REGULATING VALVE

Filed Nov. 9, 1959

INVENTOR
HOWARD T. CLARK

BY
Cushman, Darby & Cushman
ATTORNEYS

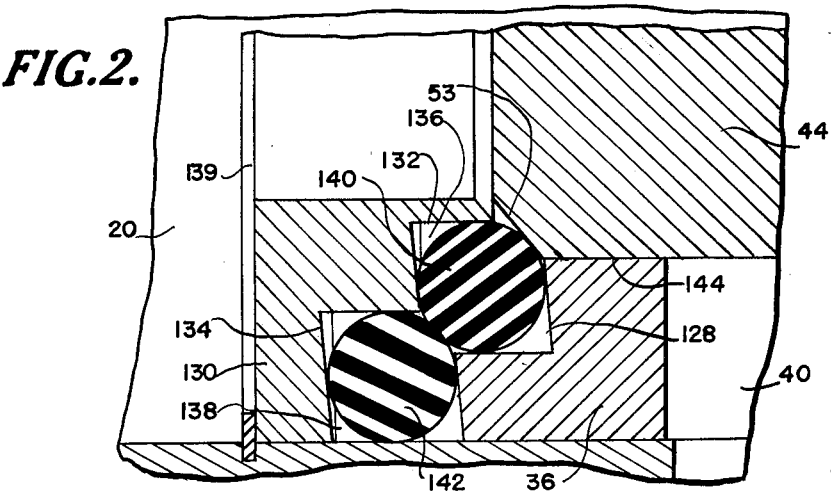

United States Patent Office 3,092,133
Patented June 4, 1963

3,092,133
FLUID REGULATING VALVE
Howard T. Clark, Shreveport, La., assignor, by mesne assignments, to Arkla Industries, Inc., Evansville, Ind., a corporation of Delaware
Filed Nov. 9, 1959, Ser. No. 851,716
3 Claims. (Cl. 137—220)

The present invention relates to fluid regulating systems, and more particularly, to a novel fluid regulator. The present invention is especially concerned with a wide range and extremely accurate fluid regulator which will provide substantially straight line flow at very close to 100% of the capacity of the system with which it is to be used.

Generally speaking, where it is desired to have a highly sensitive regulating action, there must necessarily be some similarly sensitive valve actuating means, some form of diaphragm made of a highly flexible material. However, valves of the diaphragm type are, in many cases, unsatisfactory because the diaphragms have a limited extensibility and are inherently quite stiff. This means that when diaphragms are used, they must be frequently made in large diameters in order that they will be capable of sufficient flexure to provide the necessary valve stroke and yet still be flexible enough to permit a fairly flexible or wide range regulating action. This, of course, results in a large, bulky construction which is completely out of proportion to the remainder of the valve.

Another characteristic of conventional valves is the large loss of capacity which occurs in systems incorporating such valves. The fluid flow through the valve is generally quite complicated, following some tortuous path, thereby creating a substantial pressure and flow loss in the system. Also, such valves, in order to achieve accuracy, must necessarily sacrifice a wide range of operation. In addition, valves of the type described are generally very complicated, comprising a large number of separate parts and requiring a great deal of finish machining, both of which represent an extremely high cost of fabrication.

It is therefore, a primary object of the present invention to provide a lightweight, non-bulky fluid regulator, comprising piston valve-actuating means rather than a bulky diaphragm, and yet being capable of extreme accuracy at very wide ranges of operation, the smaller size enabling the regulator to take up less room in a pipe line.

Another very important object of the present invention is the provision of a regulating valve wherein there is a substantially straight line flow of fluid through the valve, thus generally increasing the efficiency of the valve, and minimizing the possibility of there being created pressure and flow losses in the system in which the valve is utilized.

Another object of the present invention is the provision of a regulating valve which requires relatively very little machine work in its fabrication, and which is comprised of a relatively small number of parts; thus providing a valve of very economical construction and one which allows quick and convenient access to the piston and other internal parts without the possibility of damaging any of the necessary seals.

Another object of the regulating valve constituting the present invention is the provision of a valve of extremely simple construction and design wherein there is no valve stem to pack and adjust, thus eliminating the possibility of leaks and friction, and wherein there are none of the conventional double-valves which require accurate setting.

Another object of the present invention is to provide a valve which can be mounted in any position; vertically, horizontally, or at any angle, or beneath or above the ground, or in a pit.

It is a further object of the present invention to provide a regulating valve incorporating a novel double O-ring main seal whereby all the advantages of a soft seat regulator may be obtained, and yet wherein high pressure differentials may be utilized.

These and other objects of the present invention will become apparent from consideration of the following specification taken in connection with the accompanying drawings in which I have shown a preferred embodiment of my invention by way of example, and wherein:

FIGURE 2 is an enlarged sectional view of the main piston seal shown in FIGURE 1;

FIGURE 3 is a side elevational view of a portion of the valve port sleeve of the present invention, showing particularly the configuration of the valve ports;

FIGURE 4 is a schematic showing of a high pressure regulating system employing the fluid regulator of the present invention, and showing diagrammatically a pilot valve in conjunction therewith; and FIGURE 5 is a schematic illustration of a low pressure regulating system also employing the fluid regulator of the present invention.

Figure 1:
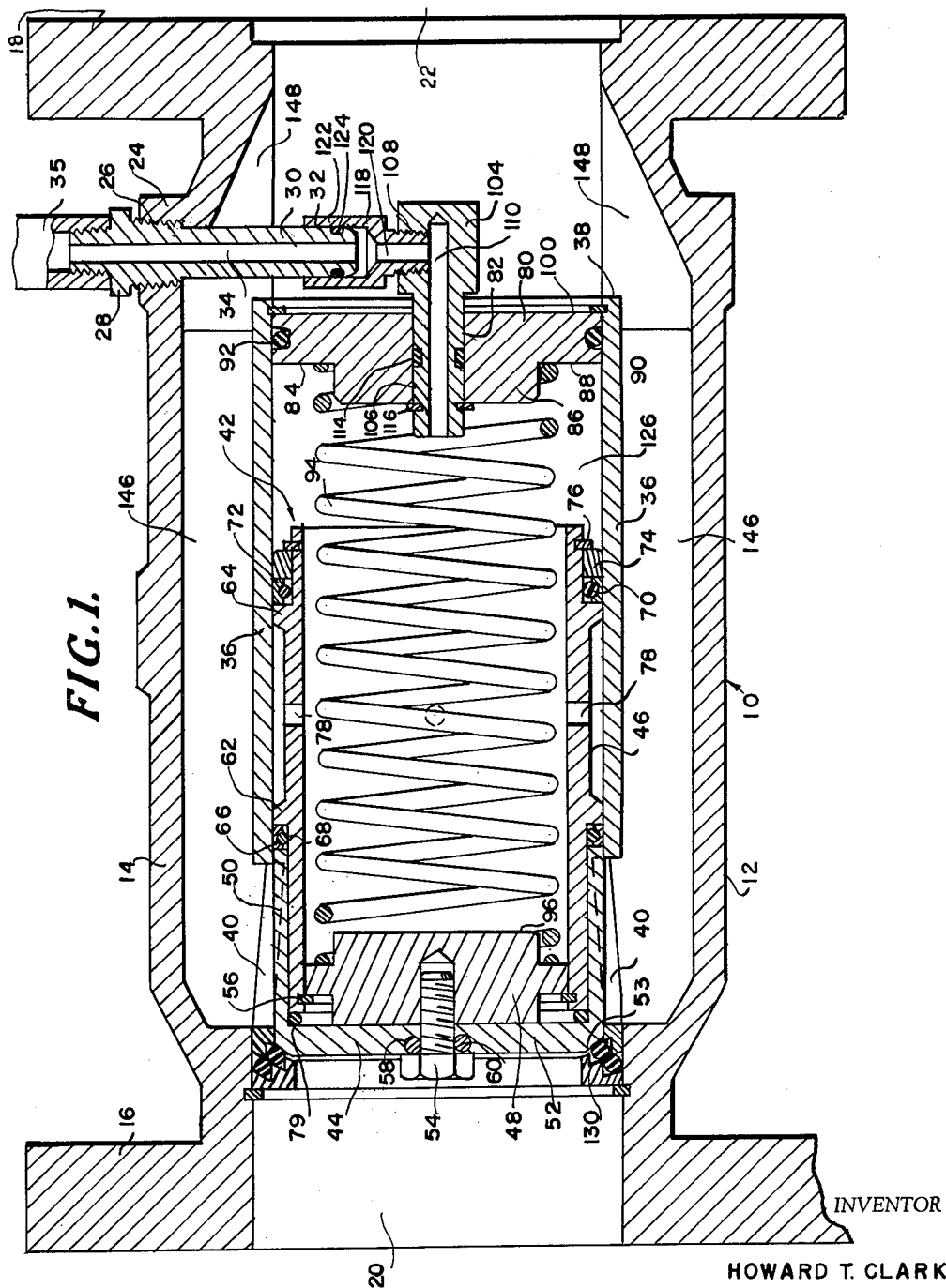
FIGURE 1 is a cross-sectional view of the fluid regulator constituting my invention.

Referring more particularly to the drawings, there is shown in FIGURE 1 in detail the construction of the regulating valve 10 constituting the present invention. This valve comprises an outer housing 12 which has a generally cylindrical intermediate portion 14 and flanges 16 and 18 at each end, respectively. The flanges provide means for connecting the valve to inlet and outlet lines in the conventional manner. At the inlet end of the housing there is provided a centrally bored inlet chamber 20, passing through the flange 16 into the open interior of the housing. Similarly, at the outlet end of the housing there is provided a centrally bored outlet chamber 22 passing through the flange 18 into the open interior of the housing. The flanges 16, 18 are cast integrally with the housing 12.

On the upper surface of cylindrical portion 14 of the housing 12 there is provided a boss 24 which is drilled and tapped to provide threaded aperture 26 therethrough. Threadedly engaged within the threaded aperture 26 is control inlet fitting 28. This fitting 28 is of conventional design, as is shown, except that it has an elongated lower extension 30 having an annular groove 32 cut therein at its lower end. Down through the center of inlet fitting 28 there is provided fluid passage 34. The purpose of this inlet fitting 28 is to receive fluid line 35 from the control means, as will be more fully described hereinafter.

Disposed centrally within the housing 12 is valve port sleeve 36. This sleeve 36 is made from standard heavy hydraulic tubing and is supported within the housing at its right hand end by annular notch 38 in the housing, as is clearly shown. The valve port sleeve 36, at its left hand end, is supported within the housing by inlet chamber 20, into which the sleeve 36 extends a short distance. Through the side walls of valve port sleeve 36 there are formed generally triangular-shaped valve ports 40, as are most clearly shown in FIGURE 3. The shape of the ports 40 can be varied to give any valve characteristic (performance v. piston travel), flow pattern, or capacity desired. Furthermore, the valve port sleeve 36 is interchangably mounted so that any one of a number of differently ported sleeves can be easily mounted within the valve. For example, each valve can be provided with a set of interchangable port sleeves for 30%, 50%, 66% or 100% of capacity, respectively, so that when a different flow or capacity is required it is only necessary to change the port sleeve. The fact that the valve of the present invention is capable of delivering 100% of capacity, due to its substantially straight line flow as will hereinafter be more fully described, is believed unique in valves of this type.

Within the valve port sleeve 36 there is disposed a slide valve, generally designated by 42, adapted to slide longitudinally within the valve port sleeve. The slide valve 42 comprises three major parts; a piston 44, a piston sleeve 46, and a connecting member 48. The piston 44 is of essentially cup-shaped configuration including side walls 50 and an end wall 52 having sealing chamfer 53. Disposed within the side walls 50 of the piston is one end of piston sleeve 46. The piston 44 is connected to the piston sleeve 46 by means of the connecting member 48 which is attached by machine screw 54 to piston 44 and which is connected to the piston sleeve by means of retaining ring 56, as indicated. Under the head of machine screw 54 there is provided an annular groove 58 in the piston to receive O-ring 60 which serves as a fluid seal between the piston 44 and the interior of piston sleeve 46. About the periphery of piston sleeve 46 there are provided ridges 62 and 64 which serve to retain in place the friction seals between the piston sleeve and the valve port sleeve. To prevent leakage between the piston sleeve and the valve port sleeve and to reduce friction between the two, there is provided between the ridge 62 and the edge of piston 44 a friction seal comprising a "Teflon" Kapseal ring 66 and an O-ring 68, as is illustrated. At the other end of the piston sleeve there is provided a second friction seal of similar construction comprising O-ring 70 and Teflon Kapseal ring 72, which are held against ridge 64 by sealing ring 74 which is, in turn, held in place about the piston sleeve by retaining ring 76. Between ridges 62 and 64, through the side wall of piston sleeve 46, are disposed drilled openings 78 which allow the fluid within the chamber defined by the valve port sleeve and piston sleeve to escape to the outside of the piston sleeve and thereby equalize the pressure across it. Disposed between piston 44 and the left end of piston sleeve 46 there is provided O-ring 79 to serve as a seal therebetween.

Located within the valve port sleeve 36 at the right end thereof is disc-shaped member 80 having therethrough, a central aperture 82. The disc-shaped member 80 has a large diameter portion 84 and a small diameter portion 86, there being disposed between these two portions flat annular surface 88. About the periphery of portion 84 there is provided a groove 90 which receives O-ring 92 to provide a seal between the disc member 80 and the valve port sleeve 36. Disposed between the disk member 80 and the connecting member 48 is compression valve spring 94 the right end of which engages annular surface 88 of disc member 80. The valve spring 94 is maintained in a central position within the slide valve by boss 96 on connecting member 48, and the small diameter portion 86 on disc member 80, as is clearly illustrated. To prevent the disc member 80 from being pushed out of the valve port sleeve 36 there is provided about the inside periphery of the valve port sleeve a retaining ring 100 to hold the disc member 80 in a fixed position.

Within the central aperture 82 of the disc member 80 there is slidably received a connecting nipple having a body portion 104, an elongated extension 106 and threaded aperture 108 communicating with a central passageway 110 within the extension 106. To provide a seal between the disc member 80 and the extension 106 there is provided, in the outside periphery thereof, a groove having disposed therein O-ring 114. In addition, there is provided retaining ring 116 for maintaining the proper fixed relationship between disc member 80 and the connecting nipple. Into the threaded aperture 108 of the connecting nipple 104 there is threadedly inserted adapter 118 having a central passage-way 120 therethrough, and a sleeve-like upper portion 122 into which is slidably received the extension 30 of the control inlet fitting 28. The necessary seal between the inlet fitting 28 and the adapter 118 is provided by the O-ring 124 disposed in groove 32 in the extension. Thus, there is provided a continuous passage-way from the control inlet fitting through the adapter, connecting member and disc member into an intermediate chamber 126, which is defined as the volume enclosed by the slide valve 42, valve port sleeve 36 and disc member 80. This intermediate chamber 126 does not communicate in any way with either the inlet or outlet chambers.

At the inlet end of the valve there is provided a main seal between the movable piston 44 and the valve port sleeve 36, as well as between the valve port sleeve 36 and both the inlet chamber 20 and the housing 12, as is most clearly illustrated in FIGURE 2. The left-most end of the valve port sleeve 36 is provided with a peripherial notch 128 around the entire periphery thereof, as is illustrated. In opposing relationship thereto there is mounted a valve seat ring 130 having notches 132 and 134 therein to define two adjacent annular chambers 136 and 138 between it and the valve port sleeve. Retaining ring 139 holds the valve seat ring 130 in place. There is disposed within chambers 136 and 138 O-rings 140 and 142 respectively. O-ring 142 provides the static seal between the valve port sleeve and both the inlet chamber and the housing, whereas O-ring 140 provides the positive shutoff seal between the piston and the valve port sleeve. It should also be noted that there exists between the piston 44 and the valve port sleeve 36 a metal-to-metal seal at surface 144, as is clearly illustrated in FIGURE 2.

The regulating valve as described is of such simple and convenient construction that the only tool necessary to disassemble and reassemble it is a small screw driver. Furthermore, since disc member 80 is easily removable from the end of the valve port sleeve, the slide valve may also be removed from this end, thus eliminating the possibility of damaging the friction seals by sliding them over the valve ports.

Again referring to FIGURE 1 there is formed between the valve port sleeve 36 and the central cylindrical housing portion 14, an annular chamber 146. At the right hand end of this chamber 146 there is provided, about the inside circumference of the housing, a series of ports 148 which serve to provide conduits for the fluid flowing from chamber 146 into outlet chamber 22. It can therefore be seen that there is provided a regulating valve wherein the fluid will flow in substantially a straight line from the inlet chamber to the outlet chamber when the slide valve is open. This feature is believed to be unique in this type of valve and makes possible a valve of essentially 100% capacity.

There is thus provided a fluid regulator comprising a housing having an inlet fluid chamber, an outlet fluid chamber, valve ports between said chambers to permit the passage of fluid from the inlet chamber to the outlet chamber and valve means for regulating the flow of fluid through said ports, said valve means comprising a piston, a valve spring for urging said piston in a direction to close said ports, and an intermediate fluid chamber disposed within said piston and adapted to communicate with a control means.

One very important use of the fluid regulator of the present invention is as a high pressure gas regulating valve, an exemplary application of which would be as the reducing valve at a city regulating station for reducing the high pressure incoming gas to a constant lower city belt pressure for distribution throughout the city. There is illustrated in FIGURE 4 a circuit diagram of the valve in such an application.

To the inlet and outlet ends, respectively, of the main regulating valve 10 there is connected, as by conventional bolted flanges, inlet gas line 150 and outlet or discharge gas line 152. Around the main valve there is provided a bypass line comprising gas lines 154 and 156 and having a conventional three-way pilot valve 158 connected therebetween, the structure of the pilot valve being shown diagrammatically. Since in this circuit the pilot valve is responsive to the discharge pressure of the main valve, there is provided a gas line 160 between the outlet pipe 152 and the control inlet to the pilot valve. The pressure to the intermediate chamber 126 of the main valve is controlled through gas line 35 connected between the control inlet fitting 28 of the main valve and the pilot valve 158. The pilot valve may be any appropriate one of the many commercially available pilot valves, as for example, the three-way diaphragm operated pilot valve illlustrated, which comprises diaphragm 162, operating cylinder 163, and three-way valve member 165 connected to said diaphragm.

The operation of the main regulating valve in the present exemplary application may be best understood by reference to FIGURES 1 and 4. When the discharge pressure in the outlet line 152 is at the proper predetermined value, as is determined by the pressure in the operating cylinder 163, there is a constant unbalance of pressure across the diaphragm 162 which causes the valve member 165 to move to the right as shown in FIGURE 4 and thereby block any flow of gas through line 156. This puts line 154 which is at high inlet pressure in direct communication with line 35, thus allowing the high pressure gas in inlet line 150 to flow into intermediate chamber 126 of the main valve. Since the intermediate chamber 126 is now at inlet pressure there is a balance of forces across the piston 44 and therefore it is held closed at its left-most position by valve spring 94, and no gas flows through the main valve. If now, gas is utilized downstream of the valve, or for any other reason the pressure in the outlet line should drop, this drop in pressure will be sensed by the diaphragm 162 of the pilot valve which will then tend to move to the left because of the constant pressure maintained on the right side thereof by operating cylinder 163. As the diaphragm 162 moves to the left so does valve member 165 thus allowing a flow of gas from both lines 154 and 35 into the outlet line 152 through line 156. This flow occurs because of the fact that the gas in lines 154 and 35 is of a much higher pressure than that in lines 156 and 152. The flow of gas from intermediate chamber 126 through line 35 naturally decreases the pressure in intermediate chamber 126. The decrease of pressure in intermediate chamber 126 causes a net force across the piston 44 tending to move it to the right and thereby open the valve. When the net force across piston 44 becomes great enough to overcome the oppositely directed force of the valve spring 94, the slide valve 42 will open and fluid will be allowed to pass from inlet chamber 20 through valve ports 40 and chamber 146 into outlet line 152. When sufficient fluid has flowed through the main valve to bring the pressure in the outlet line 152 back up to the predetermined value, it will be sensed by the diaphragm 162 which will then be sensed by the diaphragm 162 which will then move to the right and cause valve member 165 to again block line 156. It should be noted that the valve spring serves as a positive shutoff means only, the pressure in the intermediate chamber serving to control the opening and closing of the valve. This means that the operation of the valve is more linear than that where springs or toggles, etc., are used to operate the valve directly. There has of course been described just one cycle of the operation of the regulating valve, which cycle would of course repeat many times during the regulation of a system from which gas is being constantly utilized.

In one present application of my regulator to control city belt pressure, using a pilot valve of the type illustrated, an inlet pressure of 160 p.s.i. is regulated at an outlet pressure of 38 p.s.i. and is held there within a four ounce per square inch variation. This points up the extreme accuracy of regulation which can be achieved with my regulator, which regulator is of much simpler construction and capable of much wider range than many of the presently used regulators. For example, with the regulator of the present invention pressures may be easily regulated anywhere from 15 p.s.i. to 1500 p.s.i. with an inlet pressure of 1500 p.s.i., in any size from 2 inches to 8 inches, or larger. Furthermore, accuracy proportionate to the above example is achieved throughout the entire range of the valve.

In addition to the application of the fluid regulator for high pressure regulation, as is shown in FIGURE 4, there is shown schematically in FIGURE 5 a second application of the regulator wherein it is used to regulate small pressures. The main valve 10 is shown connected to an inlet line 164 and an outlet line 166. There is provided about the main valve 10 a bypass comprising connected fluid lines 168 and 170. In fluid line 168 there is disposed needle valve 172, and in fluid line 170 there is located a pilot valve 174, shown schematically. This pilot valve 174 may be of any conventional design, there being a large number of commercially available pilot valves to fit the present purpose, including the one shown diagrammatically in FIGURE 4. Between valves 172 and 174 fluid line 35 is connected to lines 168 and 170. The other end of fluid line 35 is connected to inlet fitting 28 of the main valve.

In operation, when the pressure in the outlet line 166 is equal to or greater than a predetermined value, the pilot valve 174 which is responsive to the pressure in the outlet line will block the passage of fluid through line 170. Under these circumstances, fluid from the higher pressure inlet line will gradually flow through the needle valve 172 and line 35 into the intermediate chamber 126 of the main valve until the pressure in the intermediate chamber equals the higher inlet pressure in the inlet chamber 20. The pressure then being balanced on each side of the piston 44, the slide valve 42 is closed by the action of valve spring 94. If now, fluid is utilized from the outlet line, or the down stream pressure otherwise drops, there will come a point wherein the pilot valve will begin to pass fluid therethrough from the intermediate chamber 126 into the outlet line 166, through line 170. This flow will be greater than that through line 168 which is restricted by the needle valve 172, and the pressure in the intermediate chamber 126 will therefore decrease, permitting the pressure at the inlet side of the slide valve to overcome the valve spring and thereby open the valve. With the slide valve open, fluid will flow from the inlet side, past the slide valve, into the outlet line. In this way steady pressure regulation can be achieved, notwithstanding varying amounts of use at the low side tending to change that pressure. The greater the pressure differential to be regulated, the less restriction the needle valve 172 need create, and it is only for low pressure differential regulations that a restriction in line 168 is even necessary at all, its purpose being to establish as great a pressure drop between the inlet chamber and the intermediate chamber as is possible, in order to increase the sensitivity of the regulating function of the valve.

There have been described and illustrated just two applications of the fluid regulator constituting the present invention, in both cases the valve being used as a regulating valve. In addition to these two uses, the valve may also be used as a back pressure regulator, a constant flow valve, a remote pressure operated valve, a relief valve, a check valve, or an automatic shutoff valve, and so on. In any case the valve is designed to regulate fluid flow from an inlet line to an outlet line responsive to some control means which operates the valve by varying the pressure in the intermediate chamber 126. While pilot valves do serve the function of the control means it should be realized that any means which will vary the pressure in the intermediate chamber will serve the purpose of said control means. For example, the regulating valve may be made to operate at the response of some other separate fluid system, or simply at the response of an ordinary manual valve. In such an application, in conjunction with a simple two way manual valve, to make the regulator operatable it would be necessary only to connect the fluid lines from the inlet line and control fitting of the main regulating valve (equivalent to lines 154 and 35 in FIGURE 4) to the inlet of the manual control valve, and simply vent the outlet of the manual valve to the atmosphere. With the control valve closed there would be a pressure balance across the piston and the valve spring would keep the regulating valve closed, but when the control valve is manually opened the pressure would drop in the intermediate chamber and the regulating valve would open.

It thus will be seen that the objects of this invention have been fully and effectively accomplished. It will be realized, however, that the foregoing specific embodiment has been shown and described only for the purpose of illustrating the principles of this invention and is subject to extensive change, without departure from such principles. Therefore, this invention includes all modifications encompassed within the spirit and scope of the following claims.

What is claimed is:

1. A fluid-regulating valve comprising: means defining an inlet fluid chamber; means defining an outlet fluid chamber substantially axial to and rearwardly of said inlet chamber;

sleeve means fixed substantially axially to said chambers, said sleeve means having at least one peripheral groove in the end adjacent said inlet chamber and being open at said end and having lateral ports therein near said end for passage of fluid from said inlet chamber through said open end and said ports into said outlet chamber;

piston means having its forward end exposed to fluid pressure within said inlet chamber and having a circumferential surface adjacent said end which engages said sleeve means adjacent the groove in said sleeve means, said piston means being axially slidable within said sleeve means so as to open and close said ports and forming within said sleeve means an intermediate chamber;

retainer ring means engaging the inner surface of said inlet chamber and mounted forwardly of said sleeve means and said piston means, said retainer ring means having at least two peripheral notches in the rear surface thereof facing the groove in said sleeve means thereby forming a plurality of axially spaced communicating concentric chambers adjacent said circumferential surface of said piston means;

a first fixed O-ring seal in the rearmost of said concentric chambers contacting throughout its entire circumference the groove in said sleeve means and the rearmost notch in said retainer ring means, said first O-ring seal being engageable by the forward end of said piston means;

a second fixed O-ring seal in the forward concentric chamber contacting throughout its entire circumference the inner surface of said inlet chamber, the open end of said sleeve means, the forward notch in said retainer ring means and a circumferential portion of the O-ring seal in the next rearward concentric chamber; and means for delivering fluid pressure to said intermediate chamber whereby movement of said piston is responsive to fluid pressure differential across opposite ends thereof.

2. A fluid regulating valve as in claim 1 further comprising: sealing means between said piston means and said sleeve means and removable closure means of the same diameter as said intermediate chamber in the end of said sleeve means opposite said open end whereby said piston means may be removed from said sleeve means without sliding said sealing means over said ports.

3. A fluid regulating valve as in claim 2 further comprising: axially spaced circumferential ridges on said piston means and engaging the inner surface of said sleeve means, the space between adjacent ridges being in communication with said intermediate chamber, and sealing means adjacent each ridge preventing leakage of fluid between said piston means and sleeve means.

References Cited in the file of this patent

UNITED STATES PATENTS

| | | |
|---|---|---|
| 1,776,060 | Beckwith | Sept. 16, 1930 |
| 2,525,799 | Hecker | Oct. 17, 1950 |
| 2,826,216 | Thomas | Mar. 11, 1958 |
| 2,959,188 | Kepner | Nov. 8, 1960 |
| 2,986,157 | Dollison | May 30, 1961 |

FOREIGN PATENTS

| | | |
|---|---|---|
| 451,418 | Great Britain | Aug. 5, 1936 |
| 464,547 | Germany | Aug. 21, 1928 |
| 1,054,190 | France | Oct. 7, 1953 |